United States Patent
Priyanto et al.

(10) Patent No.: US 10,680,691 B2
(45) Date of Patent: Jun. 9, 2020

(54) COVERAGE ENHANCEMENT AND BEAMFORMING

(71) Applicant: Sony Mobile Communications Inc., Tokyo (JP)

(72) Inventors: Basuki Priyanto, Lund (SE); Peter C. Karlsson, Lund (SE); Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 16/079,863

(22) PCT Filed: Feb. 25, 2016

(86) PCT No.: PCT/EP2016/054005
§ 371 (c)(1),
(2) Date: Aug. 24, 2018

(87) PCT Pub. No.: WO2017/144103
PCT Pub. Date: Aug. 31, 2017

(65) Prior Publication Data
US 2019/0068261 A1    Feb. 28, 2019

(51) Int. Cl.
*H04B 7/06* (2006.01)
*H04B 7/0452* (2017.01)
*H04L 1/18* (2006.01)
*H04L 1/08* (2006.01)

(52) U.S. Cl.
CPC ......... *H04B 7/0617* (2013.01); *H04B 7/0452* (2013.01); *H04L 1/08* (2013.01); *H04L 1/189* (2013.01); *H04L 1/1816* (2013.01); *H04L 1/1819* (2013.01)

(58) Field of Classification Search
CPC ....... H04B 7/0617; H04B 7/0452; H04L 1/08; H04L 1/816; H04L 1/1819; H04L 1/189
See application file for complete search history.

(56) References Cited

U.S. PATENT DOCUMENTS

| | | | |
|---|---|---|---|
| 2011/0122846 A1* | 5/2011 | Yu | H04L 1/0042 370/335 |
| 2013/0072140 A1* | 3/2013 | Li | H01Q 3/26 455/127.2 |
| 2013/0315083 A1 | 11/2013 | Jung | |
| 2014/0016573 A1 | 1/2014 | Nuggehalli | |
| 2014/0177607 A1 | 6/2014 | Li | |
| 2016/0295345 A1* | 10/2016 | Oh | H04W 4/70 |
| 2017/0265168 A1* | 9/2017 | Wang | H04W 4/70 |
| 2018/0235013 A1* | 8/2018 | Jung | H04W 74/0833 |
| 2018/0241526 A1* | 8/2018 | Chendamarai Kannan | H04L 27/0006 |

OTHER PUBLICATIONS

International Search Report and Written Opinion from counterpart International Patent Application No. PCT/EP2016/054005, dated Nov. 9, 2016.

* cited by examiner

*Primary Examiner* — Duc C Ho
(74) *Attorney, Agent, or Firm* — Tucker Ellis LLP

(57) ABSTRACT

A beamforming parameter is determined. A number of transmission repetitions are determined according to the determined beamforming parameter. Message are communicated between an access node and at least one terminal on a radio link using a beamformed transmission which is based on the determined beamforming parameter. The messages comprise repetitions of data. A count of the messages having the repetitions of data corresponds to the determined number of transmission repetitions.

15 Claims, 13 Drawing Sheets

COVERAGE ENHANCEMENT AND BEAMFORMING

TECHNICAL FIELD

Various embodiments relate to a method comprising determining a beamforming parameter and using beamformed transmission based on the beamforming parameter for communicating messages between an access node and at least one terminal on a radio link. The messages comprise repetitions of data encoded according to at least one redundancy version. Various embodiments relate to a corresponding device

BACKGROUND

Mobile communication by means of cellular networks is an integral part of modern life. One example of cellular networks is the Third Generation Partnership Project (3GPP) Long Term Evolution (LTE) technology.

The LTE technology is a scheduled technology where an access node—referred to as evolved node B (eNB) in the LTE framework—allocates time/frequency resources (resource blocks) for uplink (UL) and downlink (DL) communication. The LTE technology employs Transmission Time Intervals (TTI) offering a resource granularity of 1 millisecond; the TTIs are implemented by subframes.

Where a terminal requires to transmit UL payload data, it sends a UL transmission request and receives a corresponding UL transmission grant. Likewise, where the eNB requires to transmit DL data, it sends a DL assignment to the terminal to announce the DL data. Such techniques are referred to as scheduling.

In order to protect communication of data on the radio link, the LTE technology implements a Hybrid Automatic Repeat Request protocol (HARQ). Firstly, HARQ employs Forward Error Correction (FEC) by encoding data communicated in messages. By adding a respective redundancy bits according to a coding scheme, erroneously received data packets can be detected. And by adding redundancy bits to data packets according to a coding scheme, bit errors occurring during transmission can be healed to some extent. Secondly, HARQ handles erroneously received data on a radio access level and is typically implemented by a Medium Access (MAC) layer of a transmission protocol stack of the terminal and the eNB, respectively. In detail, according to the LTE technology, a payload data message communicated on the radio link in subframe n is positively or negatively acknowledged in subframe n+4. Where the payload data message is negatively acknowledged (negative acknowledgment; NACK), retransmission of the payload data message—which in some examples may now be encoded according to a different redundancy version—is implemented in subframe n–8. Such retransmission facilitates successful reception of the payload data message. Details of the HARQ protocol in the LTE technology are illustrated in the 3GPP Technical Specification (TS) 36.321 V.12.7.0 (2015-09-25).

Implementing the HARQ protocol employing different redundancy versions for different retransmission attempts enables a certain degree of time diversity and, thus, increases the likelihood of successful transmission. Thereby, the total coverage of the cellular network may be increased.

However, it is sometimes desired to even further increase the coverage. A set of features where a comparably large coverage is achieved is referred to as Coverage Enhancement (CE). CE technology is envisioned to be applied for Machine Type Communication (MTC) and the Narrowband Internet of Things (NB-IoT), sometimes also referred to as NB-LTE. These techniques may be based on the LTE technology to some extent and may reuse some of the LTE concepts.

The MTC and NB-IoT techniques are envisioned for so-called massive deployment scenarios where a large number of terminals is connected to cellular networks. E.g., it is expected that the number of terminals per access node may increase by a factor of 10-100 over the next years. In such a scenario, it is expected that up to 300,000 devices are required to be served per access node.

A key feature of the CE technology is to repeat each redundancy version of encoded data within the HARQ protocol a number of times (transmission repetitions). Such a repetition may be "blind", i.e., not in response to a respective retransmission request, but rather preemptive. Here, it is typically assumed that the repetitions of messages carrying one and the same redundancy version are implemented by a bundled transmission set of messages communicated in consecutive/subsequent subframes of a channel implemented on the radio link, see, e.g., 3GPP Technical Report (TR) 45.820 V13.0.0 (2015-08), Section 6.2.1.3. By employing a bundled transmission set, a likelihood of successful transmission can be increased even in scenarios of poor conditions of transmitting and/or receiving (communicating) on the radio link. Thereby, the coverage of the cellular network can be significantly enhanced—even for low transmission powers as envisioned within the MTC and NB-IoT domain. This facilitates the CE technology.

Typically, the number of messages including data encoded according to a given redundancy version is preconfigured by a bundling policy. The bundling policy may be chosen according to certain properties of the radio link and/or the terminal. The bundling policy may be (semi-) persistently employed for a certain time duration.

However, such techniques face certain restrictions and drawbacks. Due to the large number of transmission repetitions typically required, the traffic load on the radio link can be high.

SUMMARY

Thus, a need exists for advanced CE techniques which overcome or mitigate at least some of the above-identified drawbacks and restrictions. In particular, a need for advanced CE techniques exists which enable reliable communication of data with reduced occupation of the spectrum.

This need is met by the features of the independent claims. The dependent claims define embodiments.

According to various embodiments, a method comprises determining a beamforming parameter. The method further comprises, using the beamforming parameter: communicating messages between an access node and at least one terminal on a radio link. The messages comprise repetitions of data.

According to various embodiments, a device comprises at least one processor. The at least one processor is configured to determine a beamforming parameter. The at least one processor is further configured to communicate messages between an access node and at least one terminal on a radio link using the beamforming parameter. The messages comprise repetitions of data.

According to various embodiments, a computer program product comprises program code to be executed by at least one processor. Executing the program code by at least one processor causes the at least one processor to perform a method. The method comprises determining a beamforming parameter. The method further comprises, using the beamforming parameter: communicating messages between an access node and at least one terminal on a radio link. The messages comprise repetitions of data.

DETAILED DESCRIPTION OF EMBODIMENTS

Figure 1:
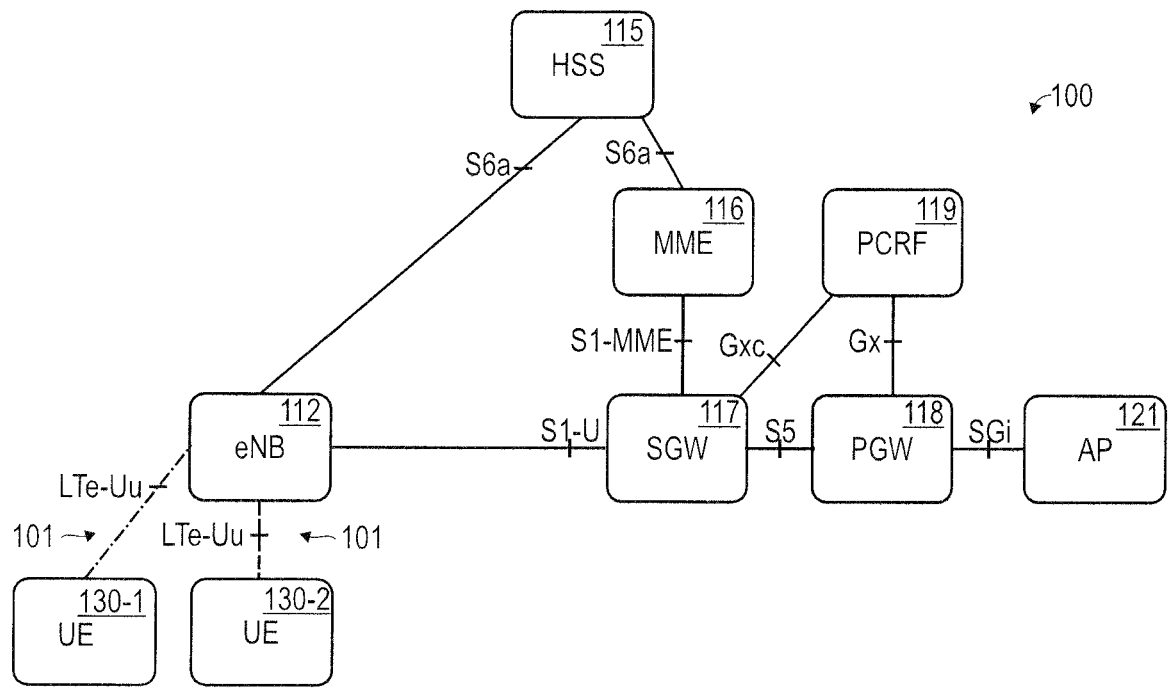
FIG. 1 is a schematic illustration of a cellular network to which a terminal is attached via a radio link.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of communicating messages on a radio link between a node of a cellular network and at least one terminal are disclosed. The messages may be payload messages including a data packet, the data packet including a higher-layer user data of an application; the messages may be control messages comprising control data. The techniques disclosed herein may be applicable to UL communication and/or DL communication.

Some example techniques disclosed herein correspond to scenarios where data, i.e., payload data and/or control data, is redundantly communicated using a plurality of messages. The messages comprise repetitions of data. In some examples, the messages may comprise data and no redundancy bits. In some examples, the messages comprise data encoded according to a single redundancy version; i.e., here the same redundancy bits are repeated. In other examples, the messages comprise different redundancy bits, i.e., more than one redundancy version. Hence, in any case, by using transmission repetitions, the same data is redundantly communicated a plurality of times. Transmission repetitions may be employed for UL and/or DL.

Decoding of the data encoded according to a given redundancy version can be based on all redundantly communicated messages. Thus, by aggregating the received information across the received messages, the probability of successfully decoding the data may be increased.

Such techniques may find particular application in the framework of the CE technology where, e.g., terminals in the MTC domain or the NB-IoT domain implement a comparably low transmit power, but due to redundant transmission of the same encoded version of the data a sufficiently high likelihood of successfully receiving the data is ensured.

In some examples, beamformed transmission is employed for communicating the messages comprising repetitions of data encoded according to at least one redundancy version. The beamformed transmission may be based on one or more beamforming parameters.

By employing the beamformed transmission for communicating the messages, the increased gain due to the beamforming (beamforming gain) may be used in order to reduce the count of the redundantly communicated messages while keeping the overall likelihood of successful receipt approximately constant. Thus, the beamformed transmission can be used to improve the general radio performance; such an improved general radio performance can be used in order to implement reliable CE technology with a reduced count of transmission repetitions.

In some examples, one or more determined beamforming parameters can be used to determine the number of transmission repetitions; then, the count of the messages comprising repetitions of data encoded according to at least one redundancy version may correspond, e.g., equal or substantially equal or be linked to, the determined number of transmission repetitions.

By coordinating properties of the CE technology and beamforming, a reliable transmission can be ensured, while traffic on the spectrum may be reduced.

In further examples, it is possible to re-use the one or more beamforming parameters for a plurality of terminals; e.g., the plurality of terminals may be selected from candidate terminals and may form a group.

By re-using the one or more beamforming parameters for the plurality of grouped terminals, the required control signaling and pilot signal overheads can be reduced. Alternatively or additionally, by re-using the one or more beamforming parameters for the plurality of grouped terminals, a complexity of the beamformed transmission can be reduced.

In some examples, it is possible to centrally schedule resource mappings for UL pilot signals and/or DL pilot signals for at least one of the plurality of grouped terminals. Pilot signals are sometimes also referred to as reference signals. Pilot signals may be employed for channel sensing. In some examples, the pilot signals are also subject to transmission repetitions, e.g., according to the CE technology. In other examples, the separate instances of the pilot signals are repeatedly communicated (periodic pilot signals). In some examples, the separate instances of the pilot signals are communicated on demand or upon request (aperiodic pilot signals).

Such centrally scheduling may correspond to coordinating the timing interval of the pilot signals, and/or a frequency pattern of the pilot signals, and/or a time pattern of the pilot signals across the at least one of the plurality of grouped terminals. Corresponding control signaling may be employed in some examples.

By centrally scheduling the resource mappings, the overhead required for communicating the pilot signals may be reduced. Further, more accurate determining of the beamforming parameters may be facilitated.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a radio link 101 between two terminals 130-1, 130-2 and the cellular network 100 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks.

A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 1. The various examples disclosed herein may be readily implemented for the 3GPP NB-IoT RAT, alternatively or additionally.

The 3GPP LTE RAT implements a HARQ protocol. The HARQ protects data communicated via the radio link 101. FEC and retransmission are employed in this respect.

Two terminals 130-1, 130-2 are connected via the radio link 101 to an access node 112 of the cellular network 100. The access node 112 and the terminals 130-1, 130-2 implement the evolved UMTS terrestrial radio access technology (E-UTRAN); therefore, the access point node 112 is an eNB 112.

E.g., each one of the terminals 130-1, 130-2 may be selected from the group comprising: a smartphone; a cellular phone; a table; a notebook; a computer; a smart TV; a MTC device, an IoT device; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. E.g., the IoT device may be connected to the EPS via the NB-IoT RAT.

In some examples, the MTC or IoT device is comparably simple in construction. E.g., it is possible that the MTC or IoT device does not include multiple antennas for beamforming.

Figure 2:
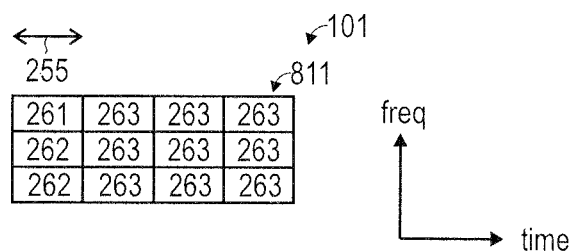
FIG. 2 schematically illustrates a plurality of channels implemented on the radio link.

Communication on the radio link 101 can be in UL and/or DL direction. Details of the radio link 101 are illustrated in FIG. 2. The radio link 101 implements a plurality of communication channels 261-263. Transmission frames 255 of the channels 261-263 occupy a certain time duration. Each channel 261-263 comprises a plurality of resource blocks or resource element or Orthogonal Frequency Division Multiplex (OFDM) symbols (resources) which are defined in time domain and frequency domain. The distribution of the resources across the channels 261-263 is defined by a resource mapping 811.

E.g., a first channel 261 may carry pilot signals which enable the eNB 112 and the terminals 130-1, 130-2 to estimate the channel quality of communicating on the radio link 101 (channel sensing).

A second channel 262 may be associated with control messages (control channel 262). The control messages may configure operation of the terminal 130, the eNB 112, and/or the radio link 101. E.g., radio resource control (RRC) messages and/or HARQ ACKs and NACKs can be exchanged via the control channel. According to the E-UTRAN RAT, the control channel 262 may thus correspond to a Physical DL Control Channel (PDCCH) and/or a Physical UL Control Channel (PUCCH) and/or a Physical Hybrid ARQ indicator Channel (PHICH).

Further, a third channel 263 is associated with a payload messages carrying higher-layer user-plane data packets associated with a given service implemented by the terminals 130-1, 130-2 and the eNB 112 (payload channel 263). According to the E-UTRAN RAT, the payload channel 263 may be a Physical DL Shared Channel (PDSCH) or a Physical UL Shared Channel (PUSCH).

Turning again to FIG. 1, the eNB 112 is connected with a gateway node implemented by a serving Gateway (SGW) 117. The SGW 117 may route and forward payload data and may act as a mobility anchor during handovers of the terminal 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the terminals 130-1, 130-2 to seek access to the packet data network.

The PGW 118 can be an endpoint of an end-to-end connection for packetized payload data of the terminal 130. The end-to-end connection may be used for communicating data of a particular service. Different services may use different end-to-end connections or may share, at least partly, a certain end-to-end connection.

The end-to-end connection may be implemented by one or more bearers which are used to communicate service-specific data. An EPS bearer which is characterized by a certain set of quality of service parameters indicated by the QoS class identifier (QCI).

Figure 3:
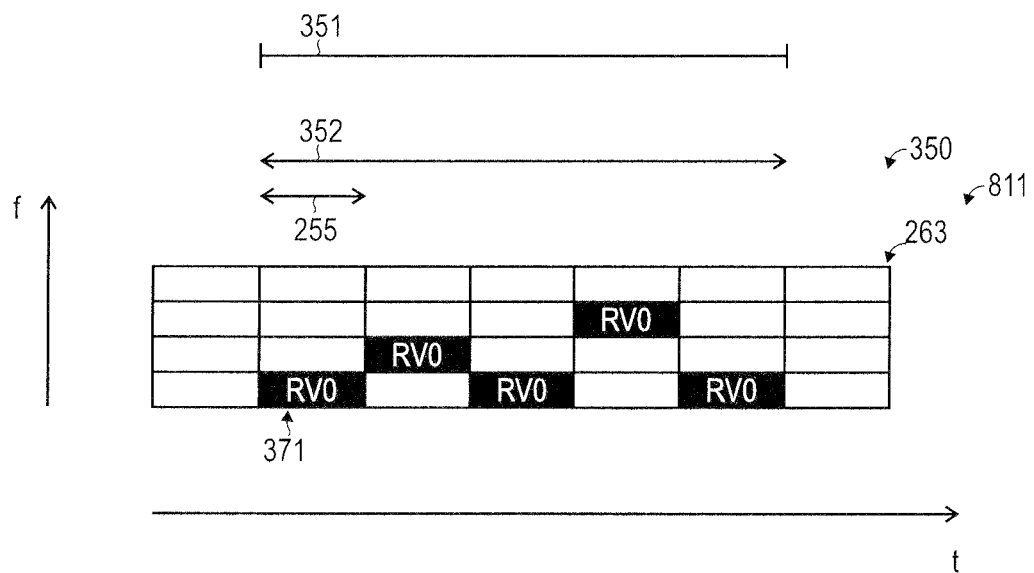
FIG. 3 schematically illustrates a bundling policy specifying a bundled transmission set of messages communicated in subsequent transmission intervals of the channel implemented on the radio link, wherein each one of the messages includes data encoded according to a given redundancy version.

FIG. 3 illustrates aspects of a bundling policy 350. The bundling policy 350 corresponds to communicating messages comprising repetitions of data encoded according to at least one redundancy version. In particular, FIG. 3 illustrates payload messages communicated via the payload channel 263. The payload messages include a data packet encoded according to a first redundancy version 371 (labeled RV0 in FIG. 3). As can be seen from FIG. 3, the messages are contiguously communicated in subsequent subframes 255 of the channel 263, thereby implementing the bundled transmission set 351. The bundled transmission set 351 has a certain duration 352 which is defined by and end where the last copy of the data packet is communicated. The duration 352 of the bundled transmission set 351 corresponds to a default number of messages which include data encoded according to a given redundancy version. Thus, the number of transmission repetitions may be set, e.g., in the example of FIG. 3 to a default number of five messages. Hence, the bundling policy 350 may specify a default number of "blind" repetitions of data. The bundling policy 350 may explicitly or implicitly specify the default number of messages.

While in FIG. 3 a scenario is shown where the bundled transmission set 351 comprises the messages in subsequent subframes 255, in other examples it is also possible that the messages comprising the given redundancy version of the data packet are arranged non-contiguously, i.e., with intermittent subframes 255 not carrying the messages.

The specific resource mapping 811 of the messages as illustrated in FIG. 3 is an example only. Other examples are conceivable.

While in FIG. 3 a scenario is shown where payload messages are communicated, similar techniques may be readily applied to other kinds and types of messages, e.g., control messages.

Figure 4:
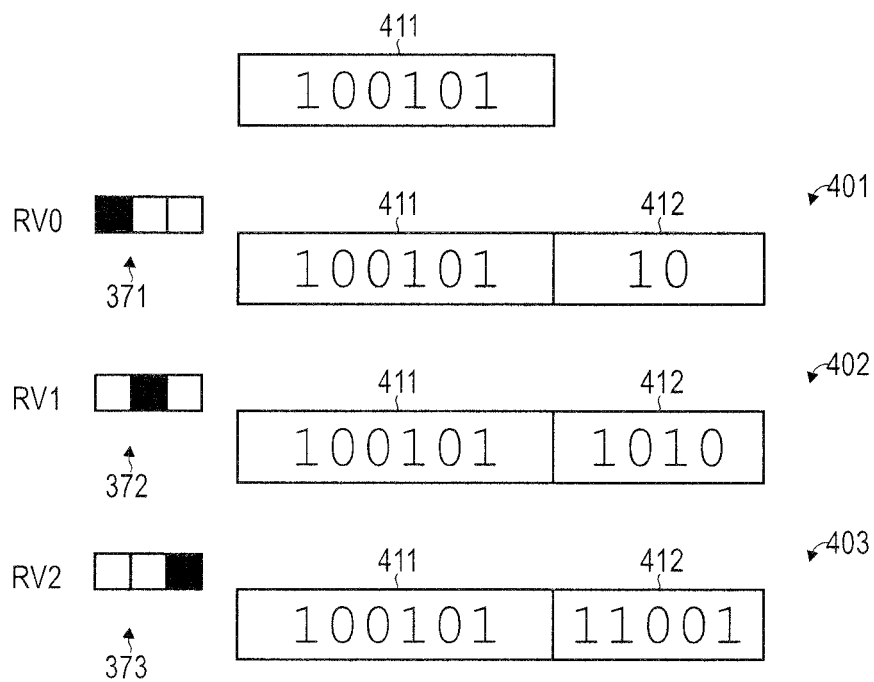
FIG. 4 schematically illustrates messages including data encoded according to different redundancy versions.

FIG. 4 illustrates aspects of encoding data 411 according to different redundancy versions 371-373. As can be seen from FIG. 4, the data 411 comprises a sequence of bits. E.g., the data 411 can be a data packet, e.g., a MAC layer Service Data Unit (SDU). It would also be possible that the data 411 corresponds to a RRC command or other control data such as a ACK, NACK, UL grant, or DL assignment.

Encoding the data 411 can correspond to adding coding bits, which may include redundancy bits 412 and/or a checksum, to the data 411. Different techniques of encoding can be employed such as, e.g., Reed Solomon encoding, turbo convolutional encoding, convolutional coding, etc. Provisioning the encoded data with the redundancy bits 412 can facilitate reconstruction of corrupted bits of the corresponding message 401-403 according to the coding scheme. Typically, the larger (smaller) number of redundancy bits 412, the more (less) robust the communication of the corresponding message 401-403 against noise and channel imperfections; thus, a probability for successfully receiving the data 411 can be tailored by the number of the redundancy bits. Alternatively or additionally, encoding the data can correspond to applying interleaving where the bits of the data 411 are shuffled (not shown in FIG. 4).

Typically, different redundancy versions 371-373 correspond to redundancy bits 412 of different number (as illustrated in FIG. 4). In other examples, it would also be possible that different redundancy version 371-373 employ the same number of redundancy bits 412, but encoded according to the different coding scheme. Alternatively or additionally, different redundancy versions may employ different interleaving schemes. Alternatively or additionally, different redundancy versions may employ different puncturing schemes.

Hereinafter, an example implementation of constructing different redundancy versions is given.

STEP 1 of constructing different redundancy versions: A block of information bits, i.e., the data 411 to be transmitted, is encoded. Here, additional redundancy bits are generated, i.e., in addition to the data 411. Let N denote the number of information bits; then—e.g., for E-UTRA RAT—the total number of the encoded bits (i.e., the sum of information bits and redundancy bits) may amount to 3N. A decoder that receives all 3N bits typically is able to decode the information bits, even if a large number of bit errors is present in the received bits due to a high BER.

STEP 2 of constructing different redundancy versions: Thus, in order to avoid excessive overhead of transmission, only a fraction of the redundancy bits is selected. The information bits and the selected redundancy bits form the first redundancy version 371. The amount of encoded bits according to the first redundancy version is 371 therefore, using the above example, somewhere between N and 3N. The process of removing redundancy bits by selecting the fraction is sometimes referred to as puncturing. This first redundancy version 371 may then be sent to the receiver.

STEP 3 of constructing different redundancy versions: In case a retransmission is required according to the HARQ protocol, a new redundancy version 372, 373 is sent. The higher order redundancy version 372, 373 includes additional redundancy bits from the ones that were previously punctured in step 2, and typically the same information bits again. In this way, after a couple of repetitions the whole 3N bits have been sent at least once.

It is generally possible to implement bundled transmission sets 351 using redundant transmissions of messages including data encoded according to a given redundancy version 371-373 for payload messages and control messages.

Figure 5:
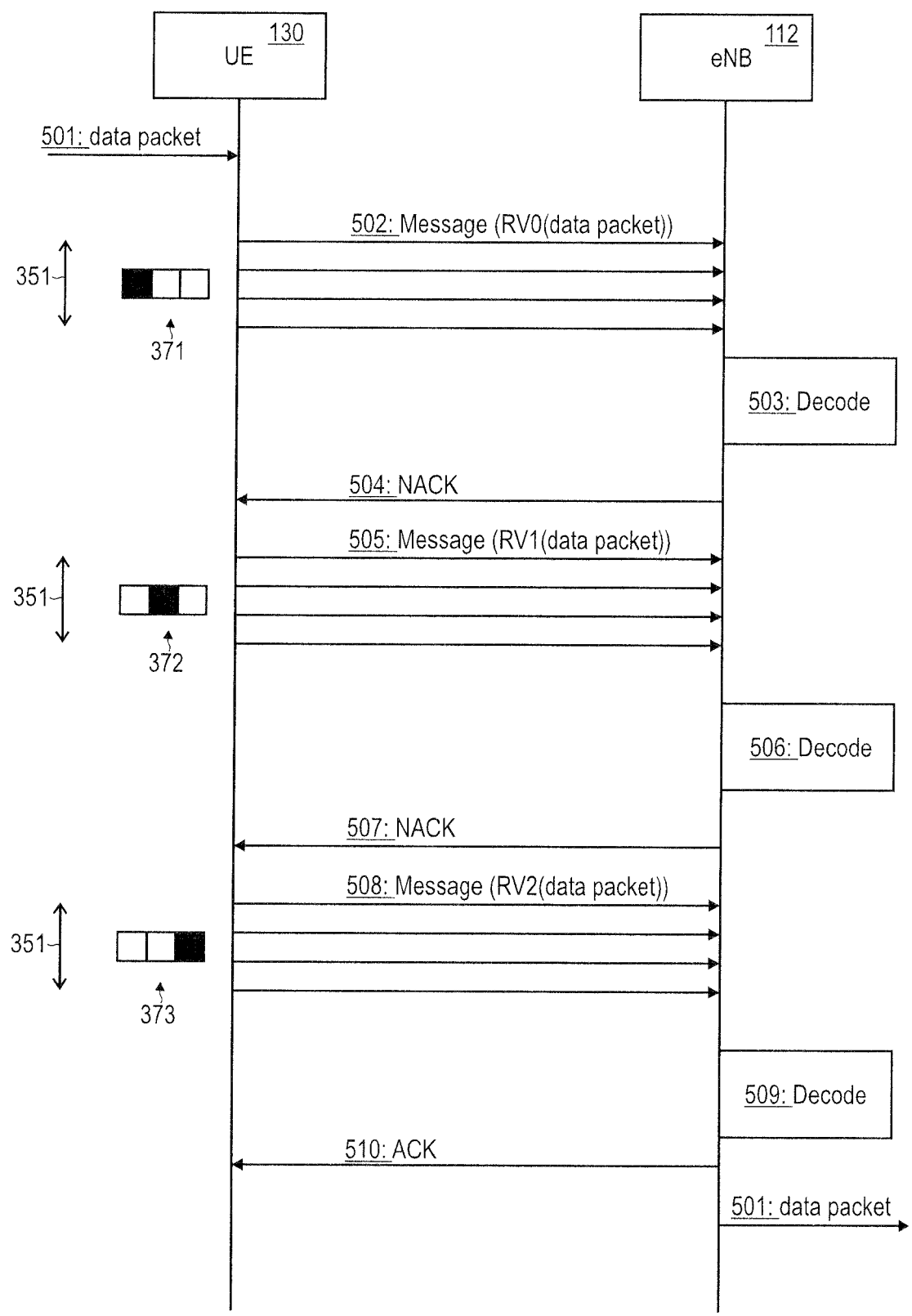
FIG. 5 is a signaling diagram of communicating bundled transmission sets comprising payload messages employing a HARQ technique according to reference implementations.

FIG. 5 illustrates aspects of the HARQ protocol implemented by the MAC layer of a communication protocol stack of a terminal 130—e.g., the terminal 130-1 and/or the terminal 130-2—and the eNB 112, respectively. The HARQ protocol, according to the example of FIG. 5, employs bundled transmission sets 351 of payload messages 502, 505, 508 within the CE technology.

In detail, first a higher-layer data packet 501 is received, e.g., in a transmit buffer implemented by the terminal 130. Then, a payload message 502 comprising a first redundancy version 371 of the data packet 501 is transmitted as a bundled transmission set 351 by the terminal 130 to the eNB 112 a plurality of times (the bundled transmission set 351 is illustrated by the multiple parallel arrows in FIG. 5). Thus, transmission repetitions are employed.

Once communication of the plurality of payload messages 502 of the bundled transmission set 351 has ended, the eNB 112 attempts to decode the data packet 501. Decoding 503 is based on all payload messages 502 of the bundled transmission set 351 to increase the probability of successfully decoding the data packet 501. In the example of FIG. 5, decoding at 503 fails and, consequently, the eNB 112 sends a NACK 504 to the terminal 130. The terminal 130 receives the NACK 504 and sends a plurality of payload messages 505 comprising the second redundancy version 372 of the data packet 501; also the payload messages 505 are sent as a bundled transmission set 351.

Once the bundled transmission set 351 comprising the plurality of payload messages 505 has ended, the eNB 112 attempts to decode the data packet 501, see 506. Decoding at 506 is based on all payload messages 505 of the bundled transmission set 351 to increase the probability of successfully decoding the data packet 501. In the example of FIG. 5, decoding at 506 fails and, consequently, the eNB 112 sends a NACK 507 to the terminal 130. The terminal 130 receives the NACK 507 and sends payload messages 508 comprising a third redundancy version 373 of the data packet 501; also the payload messages 508 are sent as a bundled transmission set 351.

Once the bundled transmission set 351 comprising the plurality of payload messages 508 has ended, the eNB 112 attempts to decode the data packet 501, 509. Decoding at 509 is based on all payload messages 508 of the bundled transmission set 351 to increase the likelihood looks of successfully decoding the data packet 501. In the example of FIG. 5, decoding at 509 is successful and consequently the eNB 112 sends an ACK 510 to the terminal 130. Also, the data packet 501, now successfully decoded, is released upper layers of the communication protocol stack of the eNB 112.

FIG. 5 is an example of communication in UL direction. Similar techniques may be readily applied for communication in DL direction.

In the example of FIG. 5, only the payload messages 502, 505, 508 have been transmitted as part of bundled transmission sets 351, i.e., have been redundantly transmitted a number of times. In the example of FIG. 5, the payload messages 502, 505, 508 use a given redundancy version 371-373. In other examples, it is also possible to implement repetitions without different redundancy versions 371-373. Alternatively or additionally, it is also possible to communicate control messages such as the NACKs 504, 507 and/or the ACK 510 a plurality of times as a bundled transmission set 351. Likewise, pilot signals (not shown in FIG. 5) can be communicated using transmission repetitions.

Figure 6:
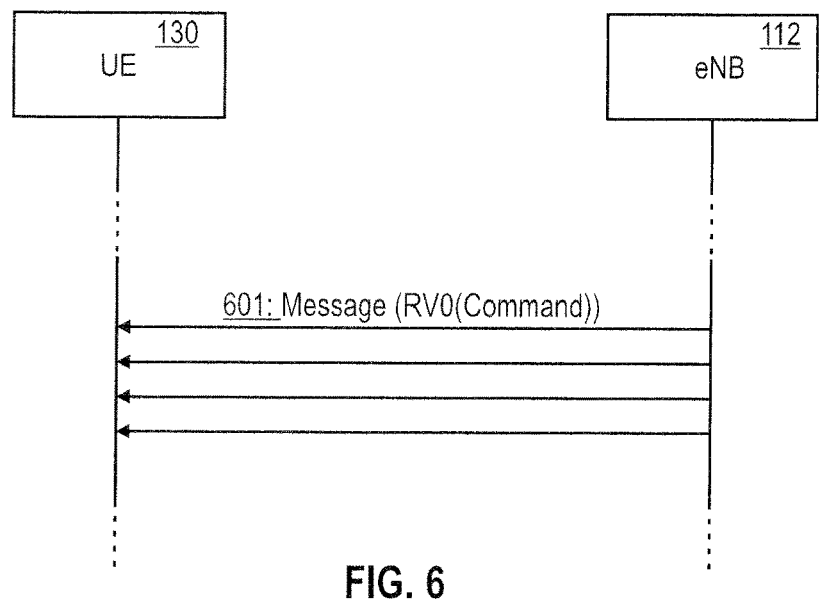
FIG. 6 is a signaling diagram of a bundled transmission set comprising a control message according to reference implementations.

FIG. 6 illustrates aspects of communicating a control message 601 a plurality of times as part of a bundled transmission set 351. Here, a respective command or instruction or piece of information (control data) may be communicated using a plurality of transmission repetitions. In some examples, the control message 601 may be encoded according to at least one redundancy version (inot shown in FIG. 6).

FIG. 6 is an example of communication in DL direction. Similar techniques may be readily applied for communication in UL direction.

Techniques of communicating control messages 601 a plurality of times as part of a bundled transmission set 351 may be employed in the various examples disclosed herein (even if not specifically mentioned). Hence, transmission repetitions as explained above can be applied in the various disclosed examples.

Figure 7:
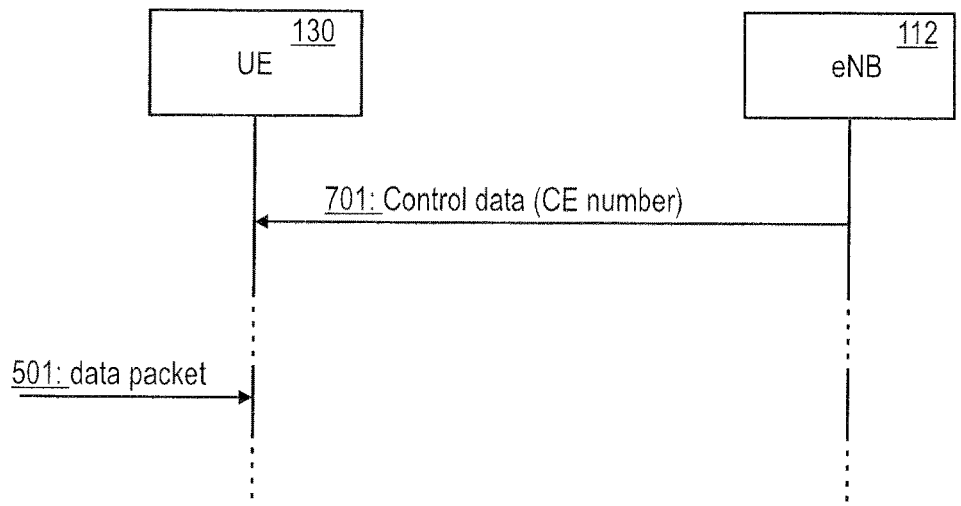
FIG. 7 is a signaling diagram of negotiating a bundling policy according to various embodiments, wherein the bundling policy specifies a default number of messages used for communication of data according to the same redundancy version.

FIG. 7 illustrates aspects of negotiating a bundling policy 350 under which messages of a bundled transmission set 351 are communicated. In the scenario of FIG. 7, dedicated control signaling 701 is implemented between the eNB 112 and the terminal 130. The control signaling 701 may be implemented, e.g., based on lower-layer (PDCCH) and/or higher-layer (RRC) signaling. The control signaling 701 may be executed during an attach phase/connection setup where the terminal 130 attaches to the eNB 112. The connection setup can comprise a Random Access procedure and a RRC setup procedure. Generally, it is possible that the control signaling 701 is executed before the data packet 501 arrives in the transmit buffer of the terminal 130. The control signaling is used to communicate a number of transmission repetitions.

While FIG. 7 illustrates a scenario where the bundling policy 350 is negotiated between the terminal 130 and the eNB 112 by means of the eNB 112 assigning a certain default number of messages including data encoded according to the same redundancy version 371-373, in other scenarios said negotiating can also comprise control signaling from the terminal 130 to the eNB 112. In other words, it is possible that the logic for determining certain parameters of the bundling policy is implemented at the eNB 112 and/or the terminal 130.

Figure 8A:
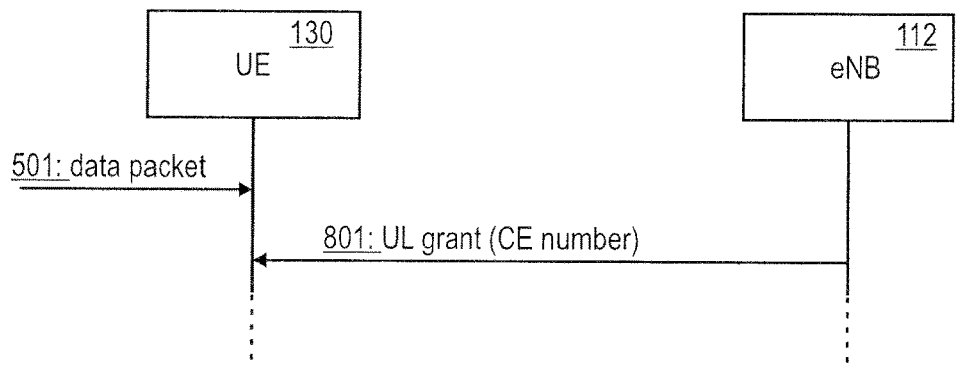
FIG. 8A is a signaling diagram of negotiating a bundling policy according to various embodiments, wherein the bundling policy specifies a default number of messages used for communication of data according to the same redundancy version.

FIG. 8A illustrates aspects of negotiating a bundling policy 350 under which messages of a bundled transmission set 351 are communicated. In the scenario of FIG. 8A, said negotiating is piggybacked onto existing control signaling 801, i.e., in the non-limiting example of FIG. 8A onto an UL grant. E.g., a respective indicator may explicitly indicate the new default number of messages according to the bundling policy 350.

Also, in the example of FIG. 8A, the properties of the bundling policy such as the number of transmission repetitions, in the scenario of FIG. 8A, are negotiated in response to the data packet 501 arriving at the transmit buffer of the terminal 130.

Figure 8B:
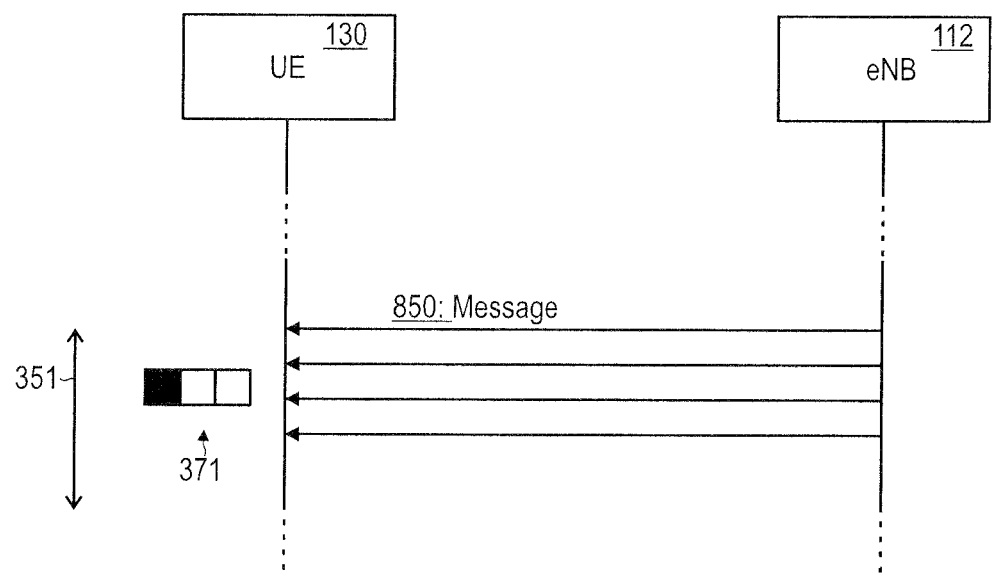
FIG. 8B is a signaling diagram of negotiating a bundling policy according to various embodiments, wherein the bundling policy specifies a default number of messages used for communication of data according to the same redundancy version.

FIG. 8B aspects of negotiating a bundling policy 350 under which messages of a bundled transmission set 351 are communicated. In the scenario of FIG. 8A, said negotiating is piggybacked onto existing signaling 850. In FIG. 8B, a new number of transmission repetitions is implicitly signaled. In particular, the number of messages 850 is smaller than the previously valid default number (as illustrated in FIG. 8B by the messages 850 not extending to the end of the bundled transmission set 351). This implicitly indicates the new number of transmission repetitions.

As can be seen from FIGS. 7 and 8A, 8B, a wide variety of potential techniques of implementing negotiating of the bundling policy between the terminal 130 and the eNB 112 exists. In particular, said negotiating may vary in terms of where the respective logic is situated (i.e., at the terminal 130 and/or the eNB 112), a direction of corresponding control signaling 701, 801, a trigger criterion for respective control signaling 701, 801, etc. Combinations of the techniques of negotiating the bundling policy 350 as illustrated by FIGS. 7, 8A, and 8B are conceivable.

The various techniques of negotiating the bundling policy 350 as illustrated by FIGS. 7, 8A, and 8B may be employed in the various examples disclosed herein (even if not specifically mentioned). In particular, the various examples of negotiating the bundling policy 350 can be employed in the context of communicating a control message which includes an indicator indicative of a number of transmission repetitions.

Hereinafter, techniques are disclosed which enable to reduce the number of required transmission repetitions for reliable communication. In some examples, these techniques rely on using beamformed transmission in combination with CE technology. Thus, in some examples, it is possible to use beamformed transmission based on a beamforming parameter for communicating messages between the eNB 112 and one or more terminals 130-1, 130-2 on the radio link 101, wherein the messages comprise repetitions of data 411. In some examples, transmission repetitions of data 411 may be employed without adding redundancy bits. In further examples, the repetitions may be encoded according to at least one redundancy version 371-373.

Figure 9:
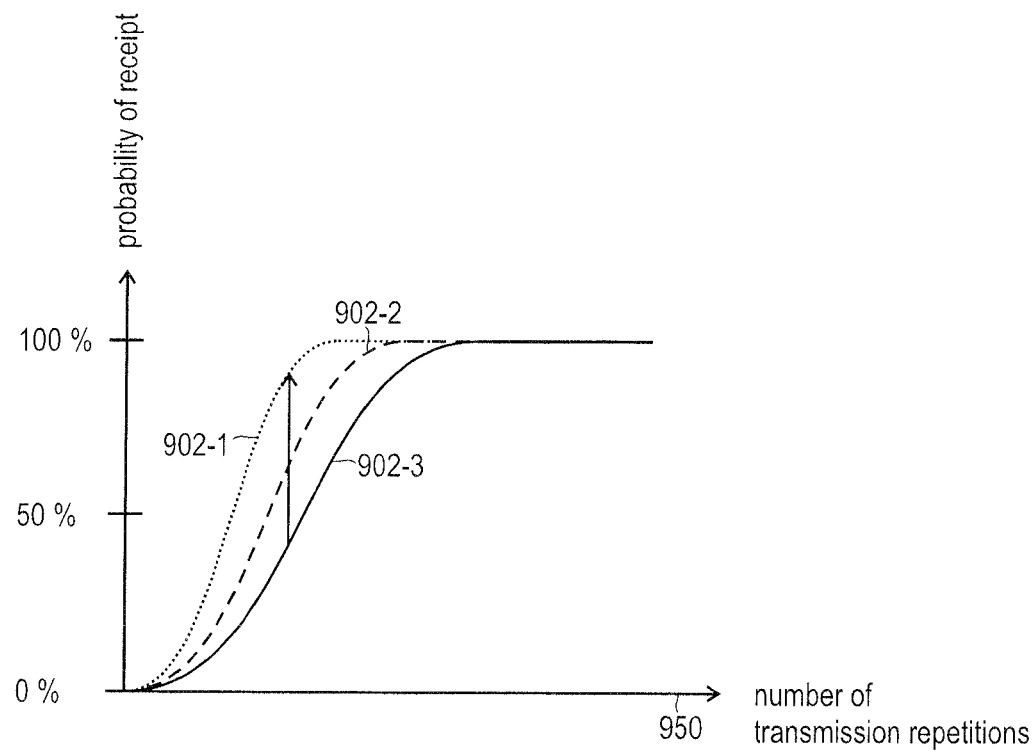
FIG. 9 schematically illustrates the probability of successful receipt of data communicated between an access node and at least one terminal on a radio link as a function of the number of repetitions encoded according to at least one redundancy version, wherein FIG. 9 plots the dependency for different beamforming parameters.

FIG. 9 illustrates aspects of the probability of receipt of data. FIG. 9 schematically plots the probability of successful receipt as a function of the number of transmission repetitions 950. In some examples, the number of transmission repetitions 950 may vary between 5 and 500, preferably between 50 and 100 (not shown in FIG. 9). The number of transmission repetitions 950 may be flexibly set depending on the specific channel quality scenario.

In FIG. 9, the probability of successful receipt is plotted for three scenarios relying on beamformed transmission using different beamformed parameters; in particular, in FIG. 9, the probability of successful receipt is plotted for different beam widths 902-1, 902-2, 902-3. As can be seen from FIG. 9, a tendency exists that for the same number of repetitions 950 a larger probability of receipt is achieved if the beamforming width 902-1-902-3 is varied appropriately (shown by the vertical arrow in FIG. 9). E.g., in some examples, a smaller (larger) beamforming width 902-1-902-3 may result in a more focused transmission and, thus, in a higher (smaller) beamforming gain; this may translate into a larger (smaller) probability of successful receipt at a given number of repetitions 950.

Figure 10:
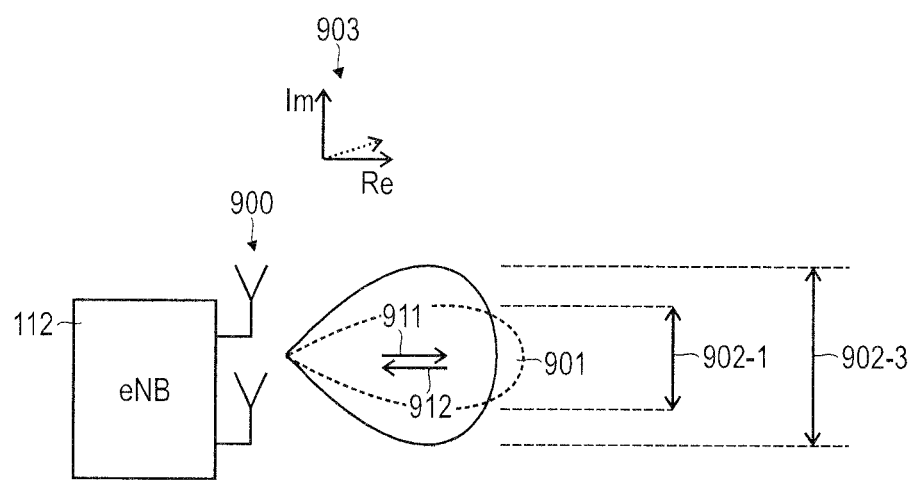
FIG. 10 schematically illustrates beamforming parameters.

FIG. 10 illustrates aspects of beamforming parameters. In FIG. 10, it is shown that in various examples disclosed herein, DL transmit beamformed transmission 911 and/or UL receive beamformed transmission 912 may be employed at the eNB 112.

Generally, in the various disclosed examples, receive beamforming and/or transmit beamforming may be employed at the eNB 112 and/or one or more terminals 130-1, 130-2. Generally, in the various disclosed examples, UL beamforming and/or DL beamforming may be employed. E.g., beamforming may employ techniques as disclosed in 3GPP TS 36.213 v13.0.0, 2016, Transmission Mode (TM) 7, 8, 9, 10.

Beamformed transmission 911, 912 typically makes use of Multiple Input Multiple Output (MIMO) techniques. MIMO techniques rely on a plurality of antennas 900. The number of antennas 900 may vary, e.g., between 2 and up to 64. In typical scenarios, it is expected that the eNB 112 may comprise a larger number of antennas 900 if compared to the individual terminals 130-1, 130-2. This is due to the increased complexity and costs associated with a larger number of antennas 900. In the various examples disclosed herein, benefit is taken of the number of antennas 900 provisioned, e.g., at the eNB 112, to communicate with one or more terminals 130-1, 130-2 according to the CE technology.

Depending on the specific amplitude and phase relationship between the antennas 900 (MIMO precoding weights 903, sometimes also referred to as precoding index or beam index), different beam widths 902-1, 902-2, 902-3 can be implemented (in FIG. 10, for sake of simplicity only beam widths 902-1, 902-3 are illustrated). The beamformed transmission can be oriented in different directions 901.

An exemplary beamforming gain—assuming correct alignment of the direction 901—is given for different beam widths in the following table 1:

TABLE 1

| Beam width | Gain (dB) | Transmission repetitions |
|---|---|---|
| 60° | 2 | 128 |
| 40° | 4 | 64 |
| 20° | 8 | 16 |
| 10° | 10 | 4 |

As can be seen, smaller beam widths 902-1, 902-2, 902-3 generally correspond to a larger beamforming gain. In some examples, depending on the particular beamforming parameter such as the number of antennas 900, the direction 901, the beam width 902-1, 902-2, 902-3, the MIMO precoding weights (precoding index, beam index) 903, and the beamforming gain, it is possible to determine the number of transmission repetitions 950.

Different quantitative and qualitative dependency between the considered beamforming parameter or beamforming parameters and the number of transmission repetitions 950 are conceivable. E.g., the dependency may be such that the probability of receipt is kept constant if compared to a non-beamforming scenario. For this, a predefined mapping between the probability of receipt and the number of transmission repetitions 950 can be taken into account (cf. FIG. 9). This may be done, e.g., as a lookup table or using a predefined dependency in parameterized form. E.g., in some examples, it is possible to take into account the default number of transmission repetitions of the bundling policy 350: e.g., the default number may serve as a reference against which the benefit in terms of beamformed transmission 911, 912 is considered. Thus, starting from the default number of the bundling policy 350, e.g., being defined with respect to non-beamformed transmission, it is then possible to selectively reduce the number of transmission repetitions 950 depending on one or beamforming parameters 900, 901, 902-1-902-3, 903.

For example, considering a scenario where UL receive beamforming is employed by the eNB 112, it is possible that the overall required transmit power/energy consumption by the transmitting terminal 130-1, 130-2 is reduced due to a reduced number of transmission repetitions 950.

The determined number of transmission repetitions 950 can be signaled between the eNB 112 and the respective terminal 130, 130-1, 130-2 using techniques as disclosed, e.g., with respect to FIGS. 7, 8A, 8B. The decision logic for determining the number of transmission repetitions 950 can generally reside at the eNB 112 and/or one of the terminals 130, 130-1, 130-2; this also decides the transmission direction of the corresponding control signaling 701, 801, 850.

While in FIG. 10 a scenario has been disclosed with respect to beamforming employed by the eNB 112, respective techniques may be readily applied with respect to beamforming employed by one or more terminals 130, 130-1, 130-2.

Figure 11:
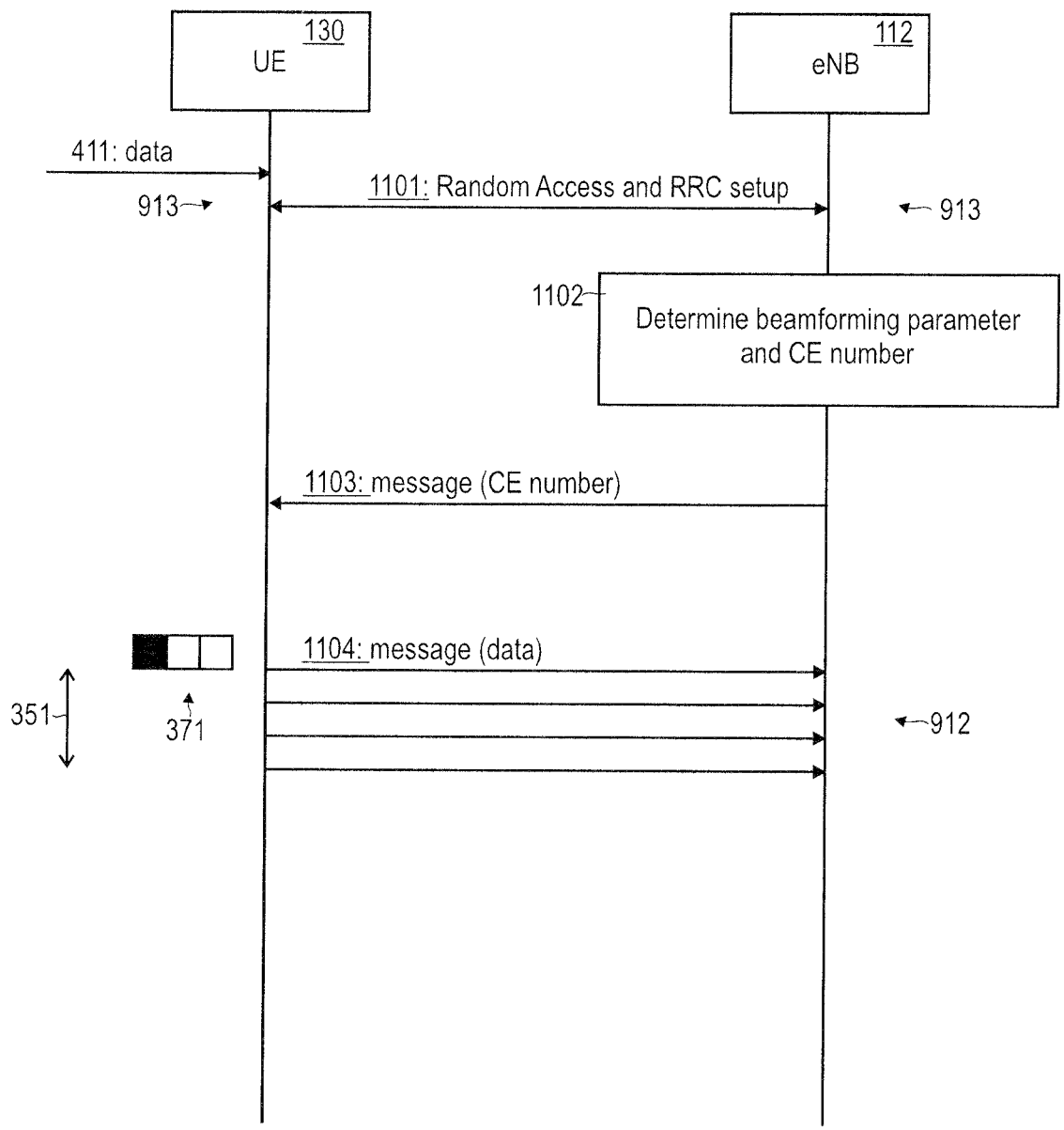
FIG. 11 is a signaling diagram of determining a beamforming parameter in the number of transmission repetitions for communicating messages between an access node and at least one terminal on a radio link according to various embodiments.

FIG. 11 is a signaling diagram illustrating aspects regarding determining a beamforming parameter 900, 901, 902-1-902-3, 903 and determining a number of transmission repetitions 950. In FIG. 11, data 411 arrives in a transmit buffer of the terminal 130. At this point, the terminal 130 is not yet attached to the cellular network 100. Thus, a Random Access procedure and a RRC setup procedure are executed, 1101. Such a connection setup 1101 when registering the terminal 130 to the access node is executed using non-beamformed transmission 913. In some examples, the non-beamformed transmission may use corresponding MIMO precoding weights 903 for all antennas 900. Thereby, an omnidirectional transmission characteristic may be achieved.

Next, at 1102, the eNB 112 determines the beamforming parameters 900, 901, 902-1-902-3, 903. Based on the determined beamforming parameters 900, 901, 902-1-902-3, 903, the eNB 112 determines the number of transmission repetitions 950. E.g., the eNB 112 may determine the beamforming parameters 900, 901, 902-1-902-3, 903 based on pilot signals communicated on the radio link 101 (not shown in FIG. 11).

Figure 13:
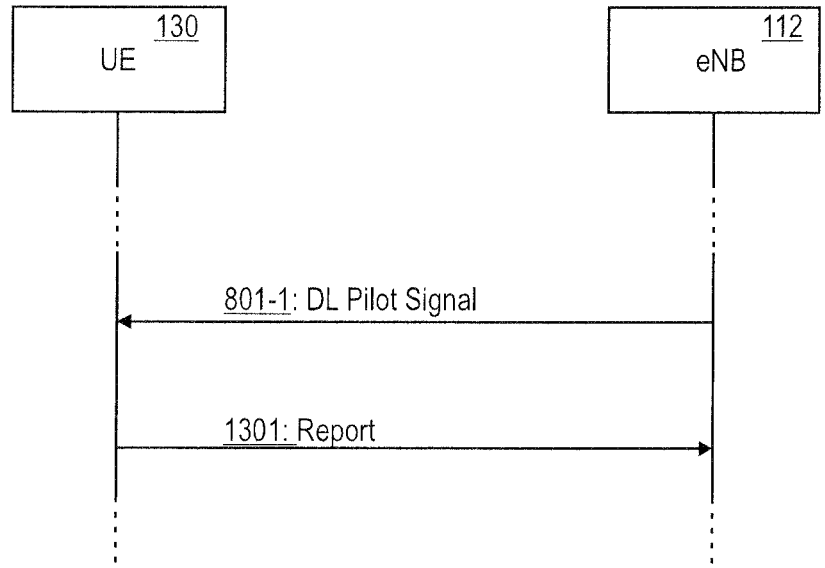
FIG. 13 is a signaling diagram of communicating a downlink pilot signals.

E.g., the eNB 112 may determine the beamforming parameters 900, 901, 902-1-902-3, 903 based on communication of DL pilot signals such as the Channel State Information Reference Signal (CSI-RS). It can be non-precoded CSI-RS and precoded (beam-formed) CSI-RS. See 3GPP TS 36.213 V13.0.0 (2016). Communicating the CSI-RS can trigger the terminal 130 to transmit a channel state information (CSI) report including such as channel quality information (CQI), Precoding Matrix Indicator (PMI), Rank Indicator (RI), beam index. The eNB 112 may then determine the beamforming parameters 900, 901, 902-1-902-3, 903 based on the CSI. See FIG. 13.

Figure 14:
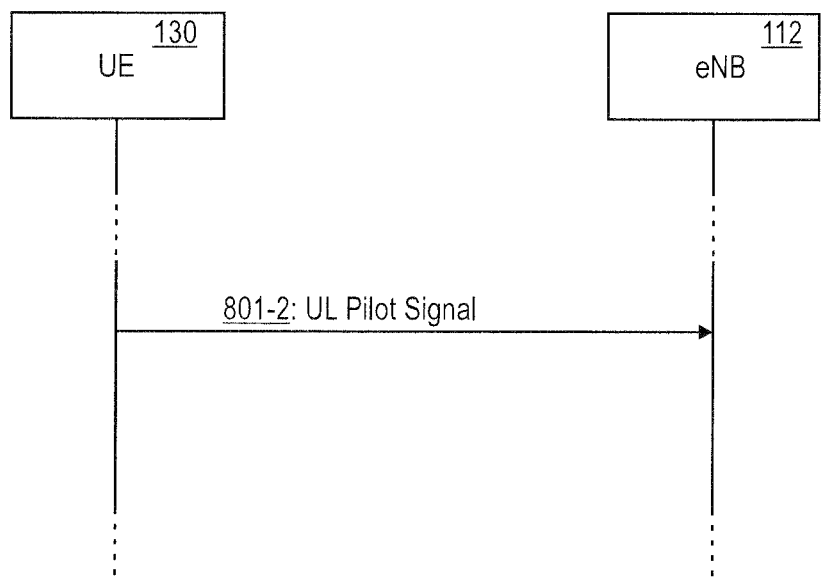
FIG. 14 is a signaling diagram of communicating an uplink pilot signal.

Alternatively or additionally the eNB 112 may determine the beamforming parameters 900, 901, 902-1-902-3, 903 based on UL pilot signals such as the Sounding Reference Signal (SRS). See FIG. 14 and 3GPP TS 36.213 V13.0.0 (2016).

Thus, if beamformed transmission 911, 912 is intended, it is possible to repeatedly communicate pilot signals 801-1, 801-2. Transmission of the pilot signals 801-1, 801-2 may be executed on a single frequency or may employ frequency hopping between a plurality of carriers, such as narrowband carriers. In some examples, it is possible that transmission repetitions 950 are also implemented for communication of the pilot signals 801-1, 801-2. Then, additional resources may be occupied for communicating the pilot signals 801-1, 801-2. E.g., the additional resources may be taken from other channels such as the PUSCH 263. Communication of pilot signals can be triggered by the eNB 112 using control signaling. E.g., RRC control signaling may be employed.

Referring again to FIG. 11, next, a control message 1103 is communicated from the access node 112 to the terminal 130. The control message 1103 includes an indicator indicative of the determined number of transmission repetitions 950. The control message 1103 may be communicated using DL transmit beamformed transmission 911 or may be communicated using non-beamformed transmission.

Then, the terminal 130 transmits a plurality of UL payload messages 1104. The plurality of UL payload messages 1104 comprise repetitions of the data 411 encoded according to the redundancy version 371. Communication of the UL payload messages 1104 is employed using receive UL beamformed transmission 912 at the eNB 112. This facilitates communicating the UL payload message 1104 at a smaller count, i.e., the determined number of transmission repetitions of 1102, 1103.

Receipt of the data 411 is successful which may be acknowledged by the eNB 112 (not shown in FIG. 11). The data 411 may then be released to a higher layers (not shown in FIG. 11).

Figure 12:
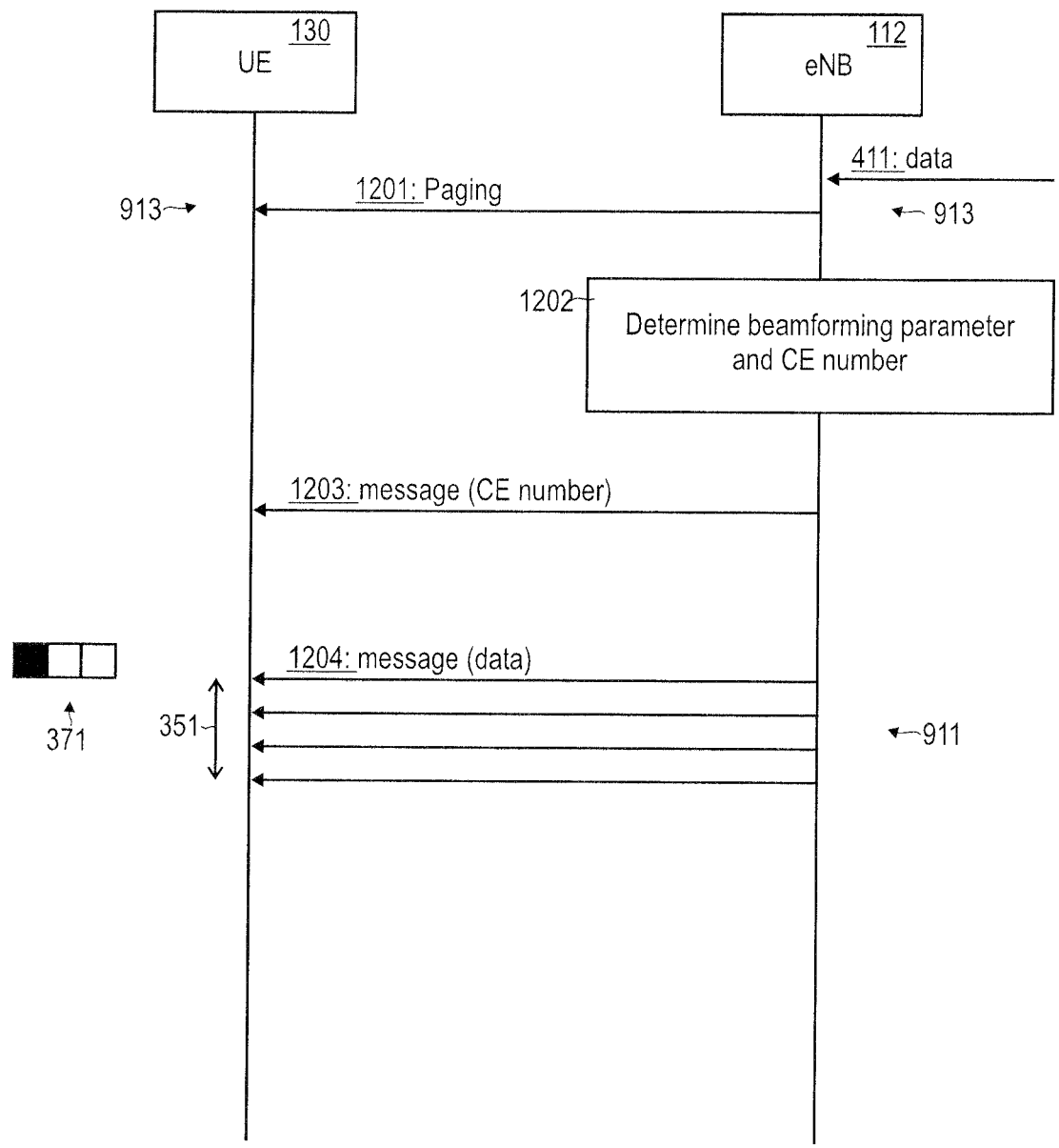
FIG. 12 is a signaling diagram of determining a beamforming parameter and a number of transmission repetitions for communicating messages between an access node and at least one terminal on a radio link according to various embodiments.

FIG. 12 is a signaling diagram which generally corresponds to FIG. 11, but illustrates a DL scenario if compared to the UL scenario of FIG. 11. In the scenario of FIG. 12, DL payload data 411 arrives in a transmit buffer of the eNB 112. The eNB 112 then transmits a paging control message 1201 directed to the terminal 130. The paging control message 1201 is indicative of a need of communicating the DL payload data 411 on the radio link 101. It is possible that the paging control message 1201 is communicated using non-beamformed transmission 913.

1202, 1203 correspond to 1102, 1103. Then, a plurality of payload messages 1204 are communicated from the eNB 112 to the terminal 130, the plurality of payload messages 1204 comprising repetitions of the data 411 encoded according to the redundancy version 371. Communication of the DL payload messages 1204 is employed using transmit DL beamformed transmission 911 at the eNB 112. This facilitates communicating the DL payload messages 1204 at a smaller count, i.e., the determined number of transmission repetitions of 1202, 1203.

Receipt of the data 411 is successful which may be acknowledged by the terminal 130 (not shown in FIG. 12). The data 411 may then be released to higher layers (not shown in FIG. 12).

In the scenarios of FIG. 11 and FIG. 12, communication of payload messages 1104, 1204 using the beamformed transmission 911, 912 has been illustrated. Corresponding scenarios may be readily implemented for communicating control messages in UL and/or DL direction. Likewise, respective scenarios may be readily implemented for communicating pilot signals in UL and/or DL direction.

By using non-beamformed transmission 913 for the Random Access and RRC setup procedure 1101 and the communication of the paging control message 1201, a likelihood of successful transmission of the corresponding control signaling can be increased. This is because after a period of inactivity, a location of the terminal 130 may only be known to the eNB 112 with a certain uncertainty. Using beamformed transmission 911, 912 would then impose the risk of communicating in the wrong direction 901.

The scenarios of FIGS. 11 and 12 correspond to the terminal 130 being in idle mode or being disconnected from the network 100. In other examples, non-beamformed transmission 913 may also be employed for DL assignments or UL grants where a need of communicating data on the radio link 101 is indicated in a connected state of the terminal 130 where, e.g., a bearer has been established.

Figure 15:
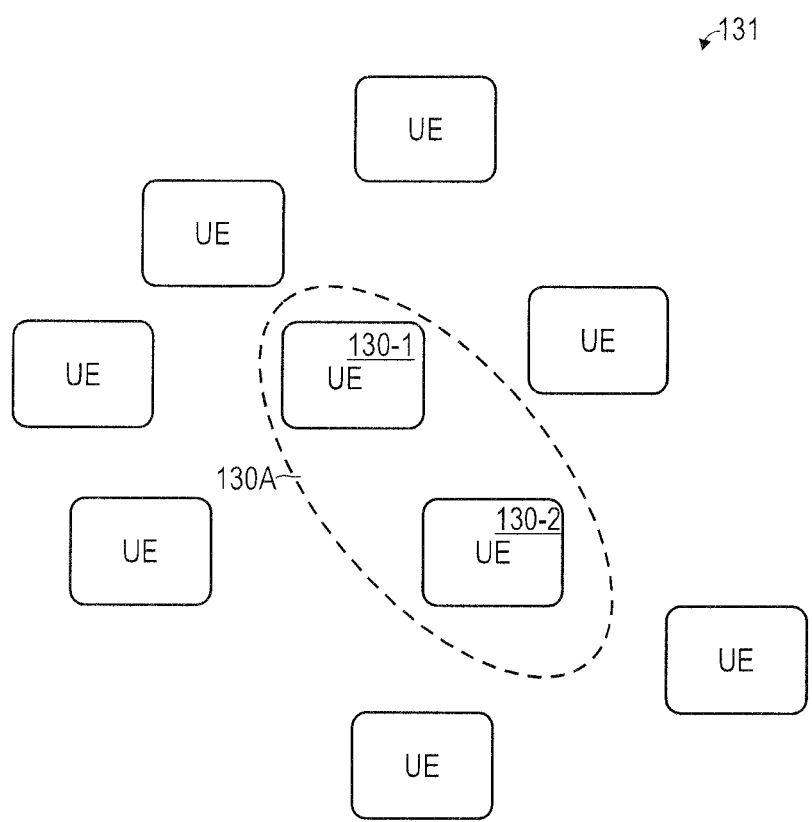
FIG. 15 schematically illustrates selecting a plurality of terminals from candidate terminals for communication using a determined beamforming parameter.

FIG. 15 schematically illustrates aspects of communicating using beamformed transmission 911, 912 between the eNB 112 and a plurality of terminals 130-1, 130-2. In the scenario of FIG. 15, a group 130A of terminals 130-1, 130-2 is defined. The eNB 112, for communicating with each terminal 130-1, 130-2 of the group 130A employs beamformed transmission 911, 912.

In some examples, the eNB 112 re-uses the beamformed parameters 900, 901, 902-1-902-3, 903 for communication with each one of the terminals 130-1, 130-2 of the group 130A. E.g., it would be possible that the eNB 112 communicates with each one of the terminals 130-1, 130-2 using the same MIMO pre-coding weights 903, the same number of antennas 900, the same direction 901, the same beamforming gain, and/or the same beam width 902-1-902-3.

By re-using one or more beamforming parameters 900, 901, 902-1-902-3, 903 for the terminals 130-1, 130-2 associated with a given group 130A, the complexity of implementation of the beamformed transmission 911, 912 can be reduced.

E.g., the terminals 130-1, 130-2 of the group 1308 can be selected from candidate terminals based on various parameters such as communication of pilot signals 801, 801-1, 801-2 on the radio link 101; and position information of the candidate terminals; and mobility information of the candidate terminal; and a predefined number of transmission repetitions 950 associated with the candidate terminals according to a bundling policy 350; device-to-device (D2D) connection between pairs of the candidate terminals; and channel quality reports 1301 of the candidate terminals.

E.g., the position information may specify the position of the candidate terminals within a coverage area of the cellular network 100. E.g., it is possible that such terminals 130-1, 130-2 are selected to belong to the group 130A which are located within a vicinity of each other. Then, it becomes possible to communicate using the same direction 901. Angle of arrival techniques or triangulation may be employed to determine the position information. Position pings based on satellite position may be employed as well.

E.g., the mobility information may specify a mobility of the candidate terminals, e.g., a tendency to move, a velocity, and acceleration, and/or an historic movement profile, etc. E.g., it is possible that such terminals 130-1, 130-2 are selected to belong to the group 130A which have a tendency to remain comparably static. Then, it becomes possible to communicate using the same direction 901 for a comparably long period of time. E.g., the mobility information may be derived from position reports received from the candidate terminals. Alternatively or additionally, the mobility information may be determined based on Doppler estimates.

E.g., it is possible to preferably group such terminals 130-1, 130-2 which have an ongoing D2D connection. This is because for such terminals 130-1, 130-2 the likelihood of being able to communicate using the same direction 901 is comparably large.

E.g., the channel quality reports 1301 may include information on the signal strength/quality experienced by the respective candidate terminal.

By using such parameters when deciding which terminals 130-1, 130-2 to select from candidate terminals when establishing the group 130A, it can be ensured that a validity of such an assignment to the group 130A is comparably time-stable. This facilitates re-using of one or more beamforming parameters.

Alternatively or additionally to re-using beamforming parameters for communicating with the plurality of terminals 130-1, 130-2 of a group 130A as disclosed above, it is also possible to re-use and share communication of pilot signals 801-1, 801-2 between the terminals 130-1, 130-2 of a group 130A. E.g., it is possible to communicate DL pilot signals 801-1 such as the CSI-RS between the access node 112 and the plurality of terminals 130-1, 130-2 of the group 130A. The DL pilot signals 801-1 can be indicative of a group identifier of the group 130A. As such, the DL pilot signals may not be cell-specific, but rather group-specific. Thereby, overhead for control signaling and pilot signals can be reduced.

E.g., it is possible that for at least one of the plurality of terminals 130-1, 130-2 assigned to a certain group 130A, pilot signals 801-1, 801-2 are communicated between the access node 112 and the respective terminal 130-1, 130-2 according to respective resource mapping 811.

Figure 16:
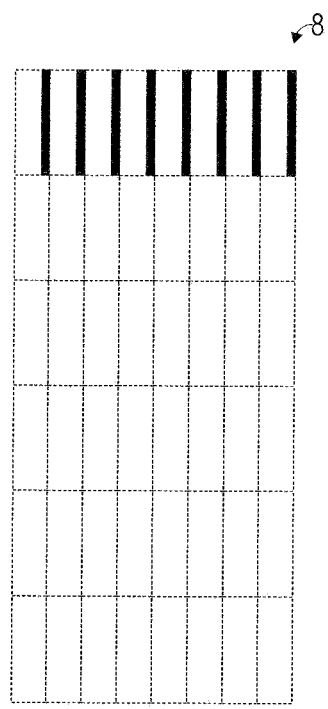
FIG. 16 is a resource mapping for communicating pilot signals between the access node and the respective terminal of the plurality of terminals selected from the candidate terminals according to various embodiments.

FIG. 16 illustrates aspects of resource mapping 811 for communicating pilot signals 801, e.g., UL pilot signals 801-2 and/or DL pilot signals 801-1, between the eNB 112 and the terminals 130-1, 130-2 assigned to the group 130A. In the example of FIG. 16, the resource mapping 811 specifies communication of pilot signals 801 only for a single terminal 130-1 of the group 130A, but not for other terminals 130-2 of the group 130A. It is possible to use the pilot signals 801 communicated between the eNB 112 and the terminal 130-1 when determining beamforming parameters for the beamformed transmission 911, 912 between the eNB 112 and, both, the terminal 130-1, as well as the terminal 130-2. By such techniques, signaling overhead can be reduced.

While in the scenario of FIG. 16, the resource signals 801 are communicated on a single frequency, in other examples, frequency hopping may be employed.

FIG. 16 corresponds to a "master" scenario where only a single terminal 130-1 per group 130A communicates pilot signals 801. Information from the "master" terminal 130-1 is used for determining appropriate beamforming parameters for all terminals 130-1, 130-2 of the group 130A.

Figure 17:
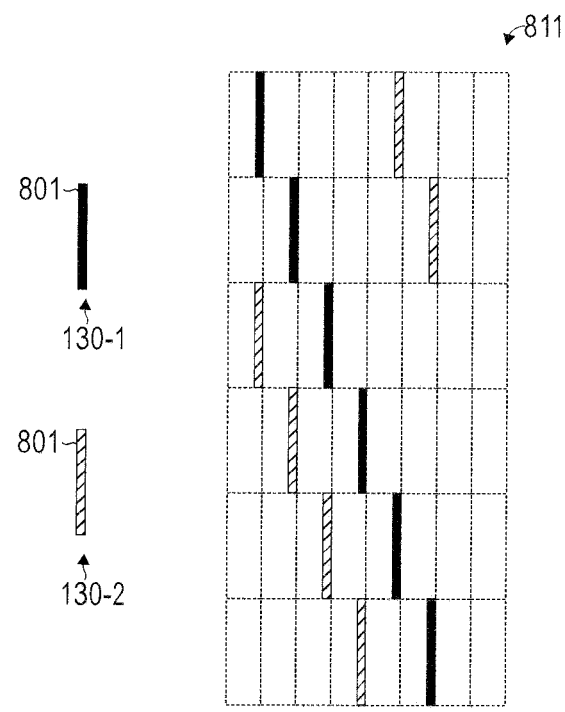
FIG. 17 is a resource mapping for communicating pilot signals between the access node and the respective terminal of the plurality of terminals selected from the candidate terminals according to various embodiments.

FIG. 17 illustrates aspects of a resource mapping 811 for communicating pilot signals 801, e.g., UL pilot signals 801-2 and/or DL pilot signals 801-1, between the eNB 112 and the terminals 130-1, 130-2 assigned to the group 130A. In the example of FIG. 17, the resource mapping 811 specifies communication of pilot signals 801 for, both, the terminal 130-1, as well as for the terminal 130-2. In the example of FIG. 17, the resource mapping 811 for the pilot signals 801 for the two terminals 130-1, 130-2 are centrally scheduled.

E.g., such centrally scheduling of the resource mapping 811 may achieve an alignment of the resource mappings 811 of the two terminals 130-1, 130-2 in time domain and/or frequency domain. E.g., such centrally scheduling of the resource mappings 811 may achieve coordination between the resource mappings 811 of the two terminals 130-1, 130-2. This may facilitate an accurate channel estimation.

In the example of FIG. 17, the resource mappings 811 of the terminals 130-1, 130-2 differ from each other with respect to a frequency pattern of the pilot signals 801. In particular, the resource mappings 811 of the terminals 130-1, 130-to define a frequency offset of 2 frequency resources between the pilot signals 801.

In the example of FIG. 17, a timing interval or periodicity between adjacent pilot signals 801 is the same for both resource mappings 811 of the two terminals 130-1, 130-2. In other examples, the timing interval may be chosen differently for different resource mappings 811.

Generally, different resource mappings 811 may differ with respect to the time pattern. E.g., the time patterns of the various resource mappings 811 may be determined according to a round robin behavior.

Figure 18:
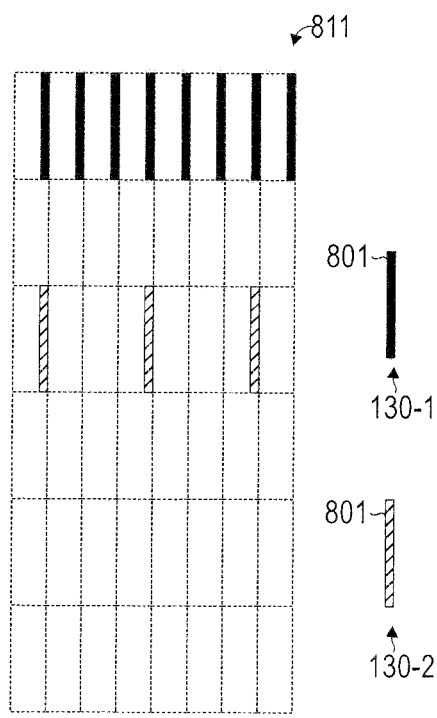
FIG. 18 is a resource mapping for communicating pilot signals between the access node and the respective terminal of the plurality of terminals selected from the candidate terminals according to various embodiments.

FIG. 18 illustrates aspects of a resource mapping 811 for communicating pilot signals 801, e.g., UL pilot signals 801-2 and/or DL pilot signals 801-1, between the eNB 112 and the terminals 130-1, 130-2 assigned to the group 130A. The example of FIG. 18 generally corresponds to the example of FIG. 17; however, the timing interval or periodicity is chosen differently for the resource mappings 811 of the two terminals 130-1, 130-2. Also, in the example of FIG. 18, frequency hopping is disabled. In the example of FIG. 18, resource signals 801 are communicated more often between the eNB 112 and the terminal 130-1 than between the eNB 112 and the terminal 130-2.

From a comparison of the non-limiting and exemplary scenarios of FIGS. 16-18, it can be seen that a wide variety of different resource mappings 811 may be employed. E.g., in the various examples disclosed herein, all such kinds and types of different resource mappings 811 may be flexibly employed and combined. For example, by focusing communication of pilot signals 801 on only a fraction of all terminals 130-1, 130-2 assigned to the group 130A, the per-terminal power consumption can be reduced on average. Further, control signaling and pilot signals overheads can be reduced, alternatively or additionally.

In various examples, the resources indicated by the resource mappings 811 may be used by periodic pilot signals that are pre-triggered by corresponding control signaling. In other examples, alternatively or additionally, the resources indicated by the resource mappings 811 may be used by aperiodic pilot signals that are triggered on demand by corresponding control signaling.

In the various examples of FIGS. 16-18, the pilot signals 801 may correspond to DL pilot signals 801-1 and/or UL pilot signals 801-2.

Various decision criteria can be taken into account in order to determine the resource mappings 811 for the terminals 130-1, 130-2 assigned to the group 130A. E.g., a channel quality report received from each one of the plurality of terminals 130-1, 130-2 assigned to the group 130A may be taken into account. E.g., a scenario where communication of pilot signals is prioritized for a single or a small subset of terminals (cf. FIG. 16) may be applicable where the single or small subset of terminals have a significantly better and/or significantly more stable channel quality than other terminals of the group 130A. Where the variations of the channel quality as indicated by corresponding channel quality reports are less severe between the various terminals 130-1, 130-2 of a group 130A, resource mappings 811 may be determined which include communication of pilot signals 801 by each one of the terminals 130-1, 130-2 of the group 130A (cf. FIGS. 17 and 18).

Control signaling, e.g., lower layer (PDCCH) or higher layer (RRC) control signaling may be employed between the eNB 112 and the plurality of terminals 130-1, 130-2, the control signaling being indicative of the respective resource mapping 811. E.g., a control message may be communicated which includes an indicator indicative of elements selected from the group comprising: the timing interval of the pilot signals 801; a frequency pattern of the pilot signals 801; and the time pattern of the pilot signals 801. Additionally, control signaling may be employed upon every change/disabling of a resource mapping 811.

Figure 19:
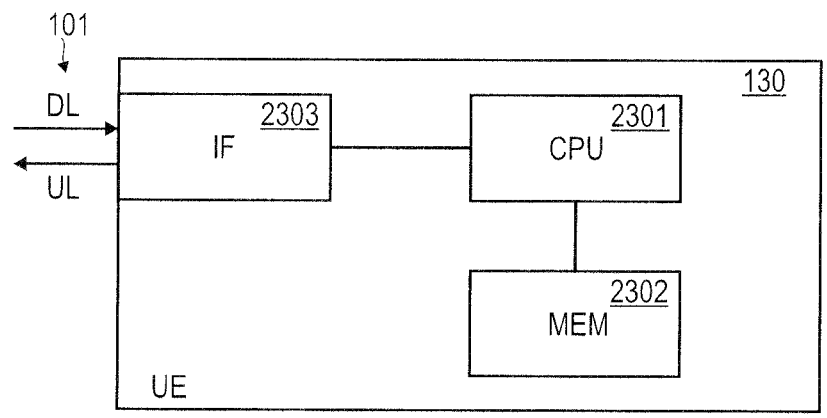
FIG. 19 schematically illustrates a terminal according to various embodiments.

FIG. 19 schematically illustrates a terminal 130. The terminal comprises a processor 2301, e.g., a single core or multicore processor. Distributing processing may be employed. The processor 2301 is coupled to a memory 2302, e.g., a non-volatile memory. The memory 2302 may store program code that is executable by the processor 2301. Executing the program code may cause the processor 2301 to perform techniques as disclosed herein, e.g., relating to: transmitting and/or receiving (communicating) data; transmitting UL messages; receiving DL messages; negotiating the bundling policy; determining a beamforming parameter 900, 901, 902-1-902-3, 903; executing beamformed transmission; determining a number of transmission repetitions; encoding data according to a given redundancy version 371-373; decoding the data; determining a resource mapping for communicating pilot signals; etc. The terminal 130 also comprises an interface 2303 configured to communicate with the eNB 112 on the radio link 101. The interface 2303 may comprise an analog front end and/or digital front end. The interface 2303 may implement a protocol stack, e.g., according to the 3GPP LTE technology. The protocol stack may comprise a physical layer, the MAC layer, etc. The interface 2303 may comprise one or more antennas.

Figure 20:
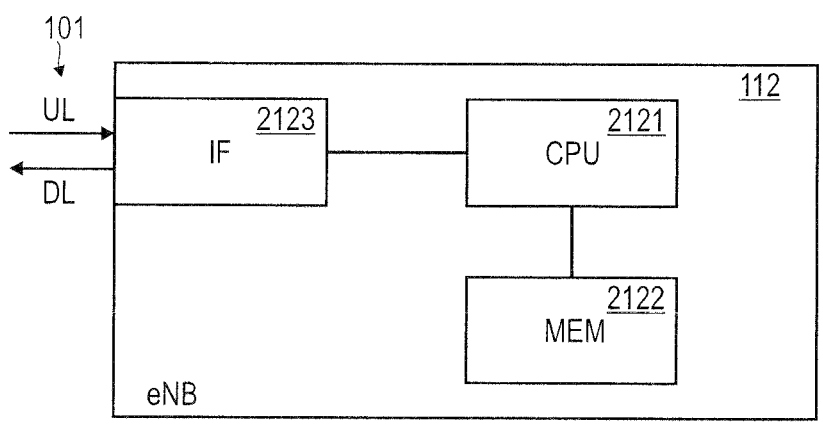
FIG. 20 schematically illustrates an access node according to various embodiments.

FIG. 20 schematically illustrates the eNB 112. The eNB 112 comprises a processor 2121, e.g., a single core or multicore processor. Distributing processing may be employed. The processor 2121 is coupled to a memory 2122, e.g., a non-volatile memory. The memory 2122 may store program code that is executable by the processor 2121. Executing the program code can cause the processor 2121 to perform techniques as disclosed herein, e.g., relating to: transmitting and/or receiving (communicating) data; transmitting DL messages; receiving UL messages; negotiating the bundling policy; determining a beamforming parameter 900, 901, 902-1-902-3, 903; executing beamformed transmission; determining a number of transmission repetitions; encoding data according to a given redundancy version 371-373; decoding the data; determining a resource mapping for communicating pilot signals; etc. The eNB 112 also comprises an interface 2123 configured to communicate with the terminal 130 on the radio link 101. The interface 2123 may comprise an analog front end and/or a digital front end. The interface 2123 may implement a protocol stack, e.g., according to the 3GPP LTE technology. The protocol stack may comprise a physical layer, the MAC layer, etc.

Figure 21:
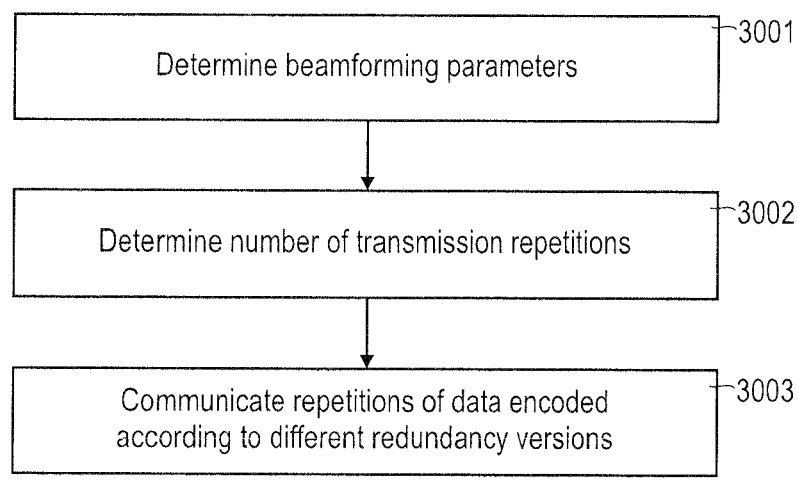
FIG. 21 is a flowchart of a method according to various embodiments.

FIG. 21 is a flowchart of a method according to various embodiments. At 3001, one or more beamforming parameters 900, 901, 902-1-902-3, 903 are determined.

The beamforming parameters 900, 901, 902-1-902-3, 903 may exhibit interdependencies. E.g., a beam width 902-1-902-3 may depend on the MIMO pre-coding weights 903. E.g., the beamforming gain may depend on the beam with 902-1-902-3 and the direction 901. E.g., the beam width 902-1-902-3 may be limited by the number of antennas 900. Such interdependencies can be taken into account at 3001.

At 3002, the number of transmission repetitions is determined. E.g., at 3002, a default number of transmission repetitions according to a bundling policy 350 defined for non-beamforming transmission 913 may be taken into account. Additionally, at 3002, the one or more determined beamforming parameters 900, 901, 902-1-902-3, 903 of 3001 can be taken into account. E.g., the determining at 3002 may reduce the number of transmission repetitions 950 if compared to the default number based on the estimated beamforming gain and while maintaining a certain level of the probability of successful receipt.

At 3002, in some examples, parameterized interdependencies between the beamforming parameters 900, 901, 902-1-902-3, 903 and the number of transmission repetitions 950 can be used. Alternatively or additionally, a lookup table may be used.

At 3003, a plurality of messages comprising repetitions of data encoded according to at least one redundancy version 371-373 is communicated. As such, a plurality of repetitions of data is communicated. The count of the plurality of messages corresponds to the determined number of transmission repetitions 950 according to 3002.

Summarizing, above techniques have been illustrated which enable to implement a lean and resource-efficient CE technology. These techniques rely on the use of beamformed transmission. E.g., receive beamformed transmission and/or transmit beamformed transmission is employed at an access node comprising a plurality of antennas. Beamformed transmission may be applicable to: payload messages; control messages; and/or resource signals communicated on the radio link.

By employing beamformed transmission, additional gain due to beamforming may be harvested and thus the number of required transmission repetitions according to the CE technology can be dimensioned to be comparably small. In particular, the transmission repetitions can be determined to be comparably small by maintaining an overall high likelihood of successful receipt.

In some examples, one or beamforming parameters such as beam width and/or MIMO pre-coding weights are re-used and shared for a plurality of grouped terminals. For this purpose, the plurality of terminals can be selected from candidate terminals and form a group. By re-using one or beamforming parameters for the plurality of grouped terminals, control signaling and pilot signals overheads can be reduced and/or a complexity of implementation of the beamformed transmission can be reduced.

In some examples, it is possible to re-use and share communication of UL pilot signals and/or DL pilot signals for the plurality of grouped terminals. E.g., resource mappings for communication of the pilot signals can be centrally scheduled in a coordinated fashion. Asymmetries can be introduced between the resource mappings of the plurality of grouped terminals in order to reduce the control signaling and pilot signals overheads. Communication of the pilot signals can be used in order to determine the one or beamforming parameters used for beamformed transmission between the access node and the plurality of grouped terminals.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while various examples have been disclosed with respect to beamforming, similar techniques may also be applied to spatial multiplexing in a corresponding manner.

E.g., while above various examples have been discussed in the framework of communicating a plurality of redundancy versions, in other examples it is not required to apply the concept of redundancy versions to transmission repetitions of data. A benefit of increased transmission reliability and/or power consumption may already be achieved where the same data is transmitted repeatedly. Using different redundancy version may optionally further increase the transmission reliability, typically at the cost of additional complexity. Thus, the various examples described herein may be readily applied to transmission repetitions without a need of using different redundancy versions.

The invention claimed is:

1. A method, comprising:
   determining a beamforming parameter,
   determining, depending on the determined beamforming parameter, a number of transmission repetitions,
   redundantly communicating messages between an access node and at least one terminal on a radio link using a beamformed transmission which is based on the determined beamforming parameter, wherein the messages comprise repetitions of data, and
   wherein a count of the messages comprising the repetitions of data corresponds to the determined number of transmission repetitions.

2. The method of claim 1, further comprising:
   communicating a control message between the access node and the terminal, the control message including an indicator indicative of the determined number of transmission repetitions.

3. The method of claim 1,
   wherein said communicating using the beamformed transmission is between the access node and a plurality of terminals.

4. The method of claim 3, further comprising:
   for each one of at least one of the plurality of terminals:
   communicating pilot signals between the access node and the respective terminal according to a respective resource mapping,
   determining the beamforming parameter based on said communicating of the pilot signals between the access node and the at least one of the plurality of terminals.

5. The method of claim 4, further comprising:
   centrally scheduling the resource mappings for the pilot signals for the at least one of the plurality of terminals,
   wherein said centrally scheduling of the resource mappings is based on channel quality reports of the plurality of terminals.

6. The method of claim 4,
   wherein the resource mappings of different ones of the at least one of the plurality of terminals differ from each other with respect to elements selected from the group comprising: a timing interval between adjacent ones of the pilot signals; a frequency pattern of the pilot signals; and a time pattern of the pilot signals.

7. The method of claim 3, further comprising:
   selecting the plurality of terminals from candidate terminals based on elements selected from the group comprising:
   communication of pilot signals on the radio link;
   position information of the candidate terminals;
   mobility information of the candidate terminals;
   predefined numbers of transmission repetitions associated with the candidate terminals according to a bundling policy,
   device-to-device connections between pairs of the candidate terminals; and
   channel quality reports of the candidate terminals.

8. The method of claim 3, further comprising:
   communicating downlink pilot signals between the access node and the plurality of terminals,
   wherein the downlink pilot signals are indicative of a group identifier of a group associated with the plurality of terminals.

9. The method of claim 8, further comprising:
determining the beamforming parameter based on said communicating of the downlink pilot signals.

10. The method of claim 1,
wherein said using of the beamformed transmission is in response to communicating a control message between the access node and the terminal, the control message being indicative of a need of communicating data on the radio link.

11. The method of claim 1, further comprising:
using non-beamformed transmission: communicating between the access node and the at least one terminal during connection setup when registering the at least terminal to the access node.

12. The method of claim 1,
wherein the beamforming parameter is selected from the group comprising: a downlink transmit beamforming parameter; and an uplink receive beamforming parameter.

13. The method of claim 1,
wherein the repetitions of data are encoded according to at least one redundancy version.

14. The method of claim 1,
wherein said determining of the number of transmission repetitions comprises that a smaller beamforming width results in a larger number of transmission repetitions, and that a larger beamforming width results in a smaller number of transmission repetitions.

15. A device, comprising:
at least one processor configured
  to determine a beamforming parameter,
  to determine, depending on the determined beamforming parameter, a number of transmission repetitions,
  to redundantly communicate messages between an access node and at least one terminal on a radio link using a beamformed transmission which is based on the determined beamforming parameter, wherein the messages comprise repetitions of data, and
  wherein a count of the messages comprising the repetitions of data corresponds to the determined number of transmission repetitions.

* * * * *